(12) United States Patent
Fu (10) Patent No.: US 12,451,999 B2
(45) Date of Patent: Oct. 21, 2025

(54) METHOD FOR PROCESSING HARQ-ACK FEEDBACK, COMMUNICATION DEVICE AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 18/024,442

(22) PCT Filed: Sep. 4, 2020

(86) PCT No.: PCT/CN2020/113607
§ 371 (c)(1),
(2) Date: Mar. 2, 2023

(87) PCT Pub. No.: WO2022/047751
PCT Pub. Date: Mar. 10, 2022

(65) Prior Publication Data
US 2023/0318750 A1    Oct. 5, 2023

(51) Int. Cl.
*H04L 1/1812* (2023.01)
*H04L 1/08* (2006.01)
(Continued)

(52) U.S. Cl.
CPC .............. *H04L 1/1812* (2013.01); *H04L 1/08* (2013.01); *H04W 72/11* (2023.01); *H04W 72/1263* (2013.01); *H04W 72/21* (2023.01)

(58) Field of Classification Search
CPC ....... H04L 1/1812; H04L 1/08; H04L 1/1854; H04L 1/1861; H04W 72/21; H04W 72/11;
(Continued)

(56) References Cited

U.S. PATENT DOCUMENTS 9,059,849 B2    6/2015   Li et al.
10,601,553 B2   3/2020   Huang
(Continued)

FOREIGN PATENT DOCUMENTS

CN    102202408 A    9/2011
CN    110505698 A    11/2019
(Continued)

OTHER PUBLICATIONS

WO 2020/029879 A1 (Year: 2020).*
(Continued)

*Primary Examiner* — Rushil P. Sampat
(74) *Attorney, Agent, or Firm* — Arch & Leke LLP; Hao Tan; Shen Wang (57) ABSTRACT

A method for processing a HARQ-ACK feedback, applied to a user equipment (UE), the method including: sending, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

15 Claims, 5 Drawing Sheets

(51) Int. Cl.
*H04W 72/11* (2023.01)
*H04W 72/1263* (2023.01)
*H04W 72/21* (2023.01)

(58) Field of Classification Search
CPC ......... H04W 72/1263; H04W 72/1268; H04W 72/14; H04W 72/23
See application file for complete search history.

(56) References Cited

U.S. PATENT DOCUMENTS

| | | |
|---|---|---|
| 2013/0016686 A1 | 1/2013 | Li et al. |
| 2021/0314105 A1* | 10/2021 | Gao ...................... H04L 1/1812 |
| 2022/0279504 A1* | 9/2022 | Ko ........................ H04W 72/23 |
| 2022/0386329 A1* | 12/2022 | Yu ......................... H04W 72/23 |
| 2023/0031360 A1* | 2/2023 | Zhang ................... H04L 1/1854 |
| 2023/0112147 A1* | 4/2023 | Chien .................. H04L 1/1861 370/329 |
| 2023/0135551 A1* | 5/2023 | Gao ...................... H04L 1/1812 370/329 |

FOREIGN PATENT DOCUMENTS

| | | |
|---|---|---|
| CN | 110519025 A | 11/2019 |
| CN | 110830176 A | 2/2020 |
| CN | 110999337 A | 4/2020 |
| WO | 2018031083 A1 | 2/2018 |

OTHER PUBLICATIONS

WO 2021/203417 A1 (Year: 2021).*
International Search Report of PCT/CN2020/113607 dated Apr. 25, 2021 with English translation, (4p).
First Office Action issued to Chinese Application No. 202080002213.1 dated Jan. 18, 2023, (9p).

* cited by examiner

METHOD FOR PROCESSING HARQ-ACK FEEDBACK, COMMUNICATION DEVICE AND NON-TRANSITORY COMPUTER-READABLE STORAGE MEDIUM

CROSS REFERENCE

The present application is a U.S. National Stage of International Application No. PCT/CN2020/113607, filed on Sep. 4, 2020, the contents of all of which are incorporated herein by reference in their entireties for all purposes.

TECHNICAL FIELD

The present disclosure relates to the field of wireless communications, but is not limited to the field of wireless communications, and in particular, to a method and an apparatus for processing an HARQ-ACK feedback, a communication device, and a storage medium.

BACKGROUND

In the related art, a configuration is proposed to shorten the period of a physical downlink shared channel (PDSCH) to a plurality of slots.

SUMMARY

According to a first aspect of the embodiments of the present disclosure, there is provided a method for processing a HARQ-ACK feedback, applied to a UE, and the method includes:

sending, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

According to a second aspect of the embodiments of the present disclosure, there is provided method for processing a HARQ-ACK feedback, applied to a base station, the method including:

receiving, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

According to a third aspect of the embodiments of the present disclosure, there is provided a communication device, the communication device includes:

a processor; and
a memory, configured to store an instruction executable by the processor;

where the processor is configured to implement the method for processing the HARQ-ACK feedback according to any embodiment of the present disclosure when running the executable instruction.

According to a fourth aspect of the embodiments of the present disclosure, there is provided a computer storage medium, the computer storage medium stores with a computer-executable program, and when the executable program is executed by a processor, the method for processing the HARQ-ACK feedback according to any embodiment of the present disclosure is implemented.

It should be understood that the above general description and the following detailed description are exemplary and explanatory, and cannot limit the embodiments of the present disclosure.

DETAILED DESCRIPTION

Example embodiments will be described in detail here, examples of which are illustrated in the accompanying drawings. The following description refers to the accompanying drawings in which the same numbers in different drawings represent the same or similar elements unless otherwise represented. The implementations described in the following example embodiments do not represent all implementations consistent with the embodiments of the present disclosure. On the contrary, they are examples of apparatuses and methods consistent with some aspects of the present disclosure as detailed in the appended claims.

The term used in the embodiments of the present disclosure is for the purpose of describing particular embodiments and is not intended to limit the embodiments of the present disclosure. As used in the embodiments of the present disclosure and the appended claims, the singular forms "a" and "the" are also intended to include plural forms unless the context clearly indicates other meanings. It should also be understood that the term "and/or" as used here refers to and includes any or all possible combinations of one or more associated listed items.

It should be understood that although the terms of first, second, third, etc., may be used in the embodiments of the present disclosure to describe various information, the information should not be limited to these terms. These terms are used to distinguish the information of a same type from each other. For example, without departing from the scope of the embodiments of the present disclosure, the first information may also be referred to as second information, and similarly, the second information may also be referred to as first information. Depending on the context, the word "if" as used here may be interpreted as "at the time" or "when" or "in response to determining".

Figure 1:
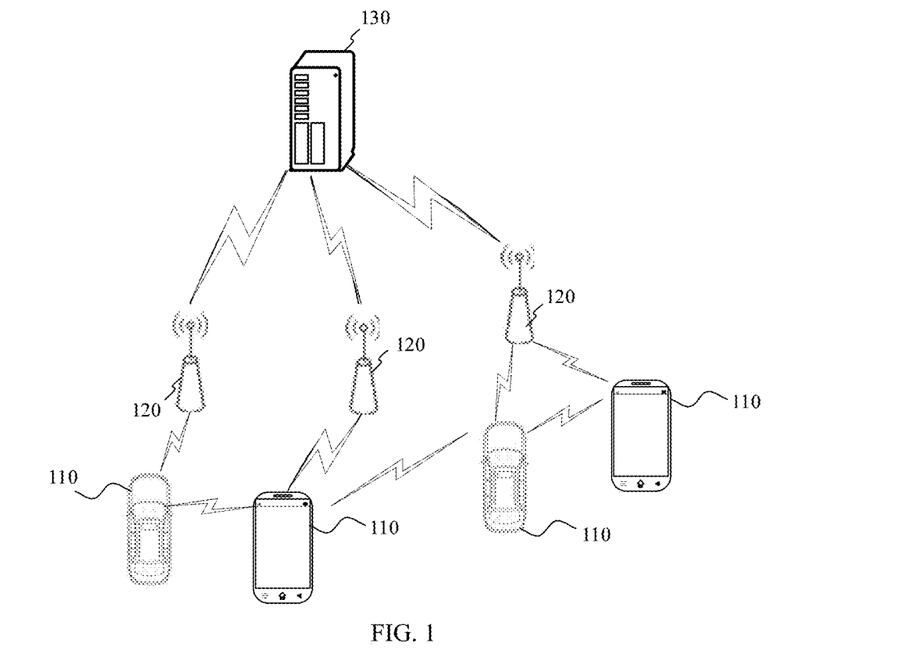
FIG. 1 is a schematic structural diagram of a wireless communication system.

FIG. 1 is a schematic structural diagram of a wireless communication system according to an embodiment of the present disclosure. As shown in FIG. 1, the wireless communication system is a communication system based on a cellular mobile communication technology, and the wireless communication system may include a plurality of user equipment 110 and a plurality of base stations 120.

The user equipment 110 may be an equipment that provides voice and/or data connectivity to a user. The user equipment 110 may communicate with one or more core networks via a radio access network (RAN). The user equipment 110 may be an Internet of Things user equipment, such as a sensor device, a mobile phone (or referred to as a "cellular" phone), and a computer with an Internet of Things user equipment. For example, it may be a fixed, portable, pocket, handheld, computer built-in or vehicle-mounted device, for example, a station (STA), a subscriber unit, a subscriber station, a mobile station, a mobile, a remote station, an access point, a remote terminal, an access terminal, a user terminal, a user agent, a user equipment, or user equipment. Alternatively, the user equipment 110 may also be an equipment of the unmanned aerial vehicle. Alternatively, the user equipment 110 may also be a vehicle-mounted equipment, for example, may be a trip computer having a wireless communication function, or a wireless user equipment externally connected to a trip computer. Alternatively, the user equipment 110 may also be a roadside equipment, for example, may be a street lamp, a signal light or another roadside equipment having a wireless communication function, etc.

The base station 120 may be a network-side device in a wireless communication system. The wireless communication system may be a 4th generation mobile communication technology (4G) system, a long term evolution (LTE) system. Alternatively, the wireless communication system may be a 5G system, also referred to as a new air interface system or a 5G NR system. Alternatively, the wireless communication system may also be a next generation system of the 5G system. The access network in the 5G system may be referred to as a new generation-radio access network (NG-RAN).

Among them, the base station 120 may be an evolution base station (eNB) used in a 4G system. Alternatively, the base station 120 may also be a base station (gNB) using a centralized distributed architecture in a 5G system. When the base station 120 adopts a centralized distributed architecture, the base station 120 generally includes a central unit (CU) and at least two distributed units (DU). A protocol stack of a packet data convergence protocol (PDCP) layer, a radio link layer control protocol (RLC) layer, and a medium access control (MAC) layer is provided in the centralized unit; a physical (PHY) layer protocol stack is provided in the distribution unit, and the specific implementation manner of the base station 120 is not limited in the embodiments of the present disclosure.

A wireless connection may be established between the base station 120 and the user equipment 110 through the wireless air interface. In different embodiments, the wireless air interface is a wireless air interface based on a fourth generation mobile communication network technology (4G) standard; or, the wireless air interface is a wireless air interface based on a fifth generation mobile communication network technology (5G) standard, for example, the wireless air interface is a new air interface; or, the wireless air interface may also be a wireless air interface based on a next generation of 5G mobile communication network technology standard.

In some embodiments, E2E (End to End) connection may also be established between the user equipment 110, such as scenarios of vehicle-to-vehicle (V2X) communication in vehicle to everything (V2X) communication, vehicle to infrastructure (V2X) communication, and vehicle to pedestrian (V2P) communication, etc.

Here, the above-mentioned user equipment may be considered to be the terminal equipment of the following embodiments.

In some embodiments, the wireless communication system may further include a network management equipment 130

The plurality of base stations 120 are respectively connected to the network management equipment 130. Among them, the network management equipment 130 may be a core network device in a wireless communication system. For example, the network management equipment 130 may be a mobility management entity (MME) in an evolved packet core (EPC). Alternatively, the network management equipment may be another core network device, such as a serving gateway (SGW), a public data network gateway (PGW), a policy and charging rules function (PCRF), or a home subscriber server (HSS), etc. For the implementation form of the network management equipment 130, the embodiments of the present disclosure are not limited.

In a related application scenario, for transmission of a downlink semi-persistent scheduling (SPS) physical downlink shared channel (PDSCH) resource, the physical uplink control channel (PUCCH) resource used for a hybrid automatic retransmission request acknowledgement (HARQ-ACK) feedback generally relates to two parameters. Among them, one parameter is the identifier (ID) of the PUCCH resource used by the high-layer signaling configuration; the other parameter is K1 that is indicated by downlink control information (DCI) of the SPS PDSCH. The ID and the K1 are semi-static parameters and cannot be changed flexibly and dynamically. That is, for the SPS PDSCH sent in the n-th slot n, the HARQ-ACK corresponding to the SPS PDSCH of the n-th slot needs to be sent on the designated PUCCH of the (n+K1)-th slot.

In the 5G NR R 15 phase, the period minimum value of the SPS PDSCH is 10 ms, which is an integer multiple of the downlink resource configuration period on NR. Therefore, the base station can ensure that the PUCCH resource of the HARQ-ACK feedback of the SPS PDSCH does not collide with the uplink and downlink resources directly by means of suitable configuration parameters. That is, the PUCCH resource for transmitting the HARQ-ACK feedback needs to be an uplink resource in a time domain position.

However, in the ultra reliables low latency communication (URLLC) at the R16 stage, a configuration is proposed to shorten the SPS PDSCH period to several slots. In the scenario of the period configuration, the PUCCH resource of the HARQ-ACK feedback of the SPS PDSCH may collide with the uplink and downlink resources, thus, resulting in that the HARQ-ACK cannot be fed back.

However, in the method for processing the HARQ-ACK feedback provided in the embodiments of the present disclosure, the HARQ-ACK feedback may be sent on a second PUCCH resource that does not collide with a preset transmission resource and is after the first PUCCH resource, when the first PUCCH resource of the HARQ-ACK feedback of the SPS PDSCH resource collides with the preset transmission resource, so that the phenomenon that the HARQ-ACK feedback cannot be transmitted due to the collision between the PUCCH resource for transmitting the HARQ-ACK feedback of the SPS PDSCH resource and the preset transmission resource can be greatly reduced, and the probability of successful transmission of the HARQ-ACK feedback can be greatly improved.

Figure 2:
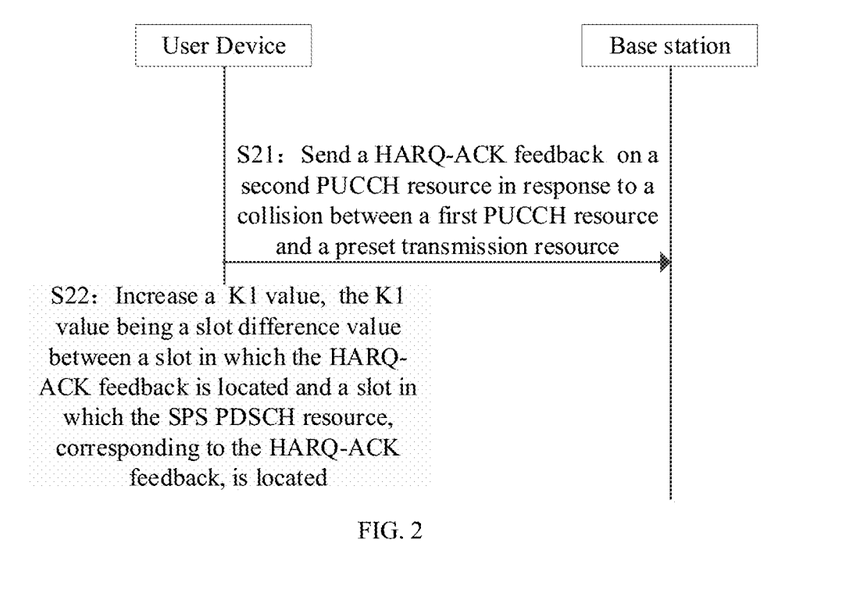
FIG. 2 is a flowchart of a method for processing an HARQ-ACK feedback according to some embodiments.

As shown in FIG. 2, an embodiment of the present disclosure provides a method for processing a HARQ-ACK feedback, applied to a UE, including the following.

In step S21, in response to a collision between a first PUCCH resource and a preset transmission resource, a HARQ-ACK feedback is sent on a second PUCCH resource.

Among them, the first PUCCH resource is a resource for transmitting the HARQ-ACK feedback of the SPS PDSCH resource; and the second PUCCH resource is located after the first PUCCH resource in the time domain and does not collide with the preset transmission resource.

The base station in the embodiments of the present disclosure is an interface equipment that the user equipment accesses the Internet; the base station may be various types of base stations, such as a 3G base station, a 4G base station, a 5G base station, or other evolved base stations; and the base station may also be a ground network base station or a non-ground network base station.

The user equipment in the embodiments of the present disclosure may be a mobile phone, a computer, a server, a transceiver device, a tablet device or a medical device, etc.

In the embodiment of the present disclosure, the preset transmission resource may include a downlink resource and/or an uplink resource other than transmission of the HARQ-ACK feedback.

For example, in some embodiments, the preset transmission resource includes: a preset transmission resource that is semi-statically configured, or a preset transmission resource that is dynamically configured.

As another example, in some other embodiments, the preset transmission resource includes at least one of the following:
  a PDSCH resource, a PUSCH resource, a PDCCH resource, and a PUCCH resource for transmitting other than the HARQ-ACK feedback.

The collision between the first PUCCH resource of the HARQ-ACK feedback and the preset transmission resource is that the first PUCCH resource is needed to transmit the HARQ-ACK and the preset transmission resource is needed to transmit data in the same time domain.

Figure 3:
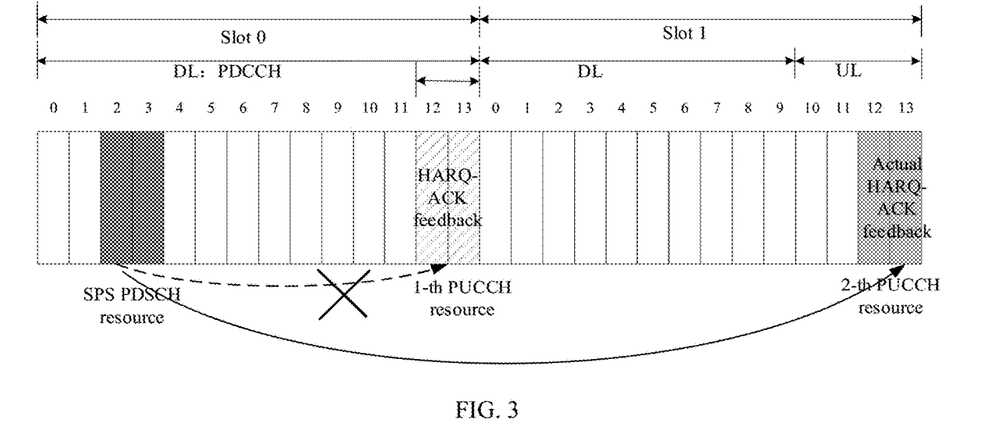
FIG. 3 is a schematic diagram of a time domain resource according to some embodiments.

For example, if the preset transmission resource is the PDCCH resource, as shown in FIG. 3, the 12-th symbol and the 13-th symbol in the slot 0 need to use the PUCCH resource to upload the HARQ-ACK feedback. However, the entire slot 0 is a PDCCH resource, and then the first PUCCH resource for transmitting the HARQ-ACK feedback at the 12-th symbol and the 13-th symbol of the slot 0 collides with the PDCCH resource.

In the embodiment of the present disclosure, the HARQ-ACK feedback is sent on the second PUCCH resource that does not collide with the preset transmission resource and is after the first PUCCH resource, when the first PUCCH resource of the HARQ-ACK feedback of the SPS PDSCH resource collides with the preset transmission resource, so that the phenomenon that the HARQ-ACK feedback cannot be transmitted due to the collision between the PUCCH resource for transmitting the HARQ-ACK feedback of the SPS PDSCH resource and the preset transmission resource can be greatly reduced, and the probability of successful transmission of the HARQ-ACK feedback can be greatly improved.

For example, referring to FIG. 3 again, in the slot 1, when the first PUCCH resource collides with the PDCCH resource, the HARQ-ACK may be transmitted on the 12th symbol and the 13-th symbol in the slot 1 by using the second PUCCH resource. The second PUCCH resource here is located after the first PUCCH resource in the time domain, and the 12-th symbol and the 13-th symbol in the slot 1 are the second PUCCH resource.

Referring to FIG. 2 again, in some embodiments, the method for processing the HARQ-ACK feedback further includes the following.

In step S22, a K1 value is increased, where the K1 value is a slot difference between a slot where the HARQ-ACK feedback is located and a slot where the SPS PDSCH resource corresponding to the HARQ-ACK feedback is located;
  a second PUCCH resource is determined based on the increased K1 value.

For example, the SPS PDSCH resource is in the first slot, the K1 value is increased to 1, the slot where the HARQ-ACK feedback is located is the second slot, then, the second PUCCH resource is in the second slot, and the symbol of the second slot where the second PUCCH resource is located is the same as the symbol of the first slot where the first PUCCH resource is located.

In some embodiments, increasing the K1 value includes:
  increasing the K1 value according to the preset transmission resource colliding with the first PUCCH resource.

In the above step S22, the K1 value is increased, and the K1 value may be increased to 1, 2, or M, where M is an integer greater than or equal to 1.

In one embodiment, increasing the K1 value according to the preset transmission resource colliding with the first PUCCH resource may be: increasing the K1 value until that the second PUCCH resource corresponding to the increased K1 value does not collide with the preset transmission resource.

In some embodiments, the K1 value is less than or equal to a preset value.

For example, in one embodiment, the preset value is 31. In this example, the K1 value can be increased up to 31, that is, a PUCCH resource that does not collision in the time domain of the 0-th to 31-th slots for transmission of the HARQ-ACK feedback.

Figure 4:
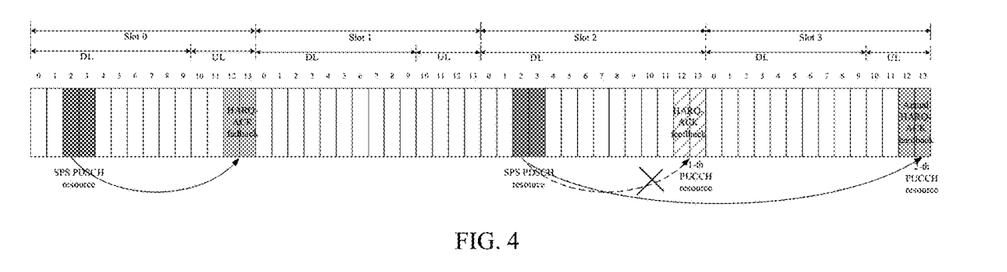
FIG. 4 is a schematic diagram of a time domain resource according to some embodiments.

For example, the period of the SPS PDSCH resource is 2 slots, the base station configures the ID of the PUCCH resource by means of radio resource control (RRC) signaling, where the ID is the position of the PUCCH resource in the time domain, and the ID in the present example indicates that the 12-th to 13-th symbols are PUCCH resources for transmitting the HARQ-ACK. The base station indicates that the interval K1 value between the slot where the HARQ-ACK is located and the slot where the corresponding SPS PDSCH resource is located is 0 by means of the activation DCI of the SPS PDSCH resource. As shown in FIG. 4, in slot 2, the 10-th to 13-th symbols are dynamically indicated as symbols of downlink resources (DL), and in slot 3, the 10-th to 13-th symbols are dynamically indicated as symbols of uplink resources (UL). Since the 10-th to 13-th symbols in the slot 2 are dynamically indicated as the symbols of the downlink resource, the first PUCCH resource of the HARQ-ACK feedback collides with the downlink resource of the slot 2 and cannot be transmitted. By increasing the K1 value, when the K1 value is increased to 1, the second PUCCH resource of the HARQ-ACK feedback is in the 10-th to 13th symbols of the slot 3, then the HARQ-ACK feedback will be transmitted on the second PUCCH resource in the slot 2+1 (i.e., the slot 3).

For example, in the above example, if the PUCCH resource of the HARQ-ACK feedback of the SPS PDSCH resource after extension is still in the downlink resource or other semi-statically configured uplink and downlink resources and/or dynamically configured uplink resources when the K1 value is increased to 1, the value of K1 continues to be increased, for example, to 2 or 3. Until that the second PUCCH resource of the HARQ-ACK feedback of the SPS PDSCH resource with the increased K1 value is in the uplink resource, the HARQ-ACK feedback is transmitted on the second PUCCH resource.

For example, in the above example, when the K1 value is increased to 31, if it is not found that the PUCCH resource of the HARQ-ACK feedback of the SPS PDSCH resource does not collide with the preset transmission resource, then the K1 value is not increased any more. At this time, the UE may give up transmission of the HARQ-ACK feedback. In this way, after the K1 value exceeds 31, the time for transmission of the HARQ-ACK feedback has been relatively long apart from the time when the information is received on the SPS PDSCH resource, so that the HARQ-ACK feedback does not need to be transmitted.

For example, if the period of the SPS PDSCH resource is 2, and if the first PUCCH resource of the HARQ-ACK feedback of the SPS PDSCH resource collides with the preset transmission resource in the 0-th slot, when the K1 value is increased to 2 or greater than 2, the second PUCCH resource of the HARQ-ACK feedback of the SPS PDSCH resource, after the K1 value is increased, is in the second slot or the slot after the second slot. In this case, the second PUCCH resource and the first PUCCH resource are not in the same period. As such, in this example, the HARQ-ACK feedback may be sent on a second PUCCH resource in a period of SPS PDSCH resources different from the first PUCCH resource.

In other examples, the HARQ-ACK feedback may also sent on a second PUCCH resource in a period of the SPS PDSCH resource that is the same as the first PUCCH resource.

In the embodiment of the present disclosure, the UE may find the second PUCCH resource that does not collide with the preset transmission resource by increasing the K1 value to send the HARQ-ACK feedback, thus greatly reducing the occurrence of a collision between the PUCCH resource for sending the HARQ-ACK feedback and other uplink and downlink resources, and improving the success rate of sending the HARQ-ACK feedback.

In the above embodiment, the ID of the second PUCCH resource of the HARQ-ACK feedback may also be changed, so that the HARQ-ACK feedback is transmitted on the second PUCCH resource after the ID is changed, where the ID is a symbol indicating a slot where the PUCCH resource is located.

One implementation of changing the ID of the second PUCCH resource of the HARQ-ACK feedback here is: receiving the first RRC signaling sent by the base station, where the first RRC signaling carries the ID to be changed of the second PUCCH resource.

Figure 5:
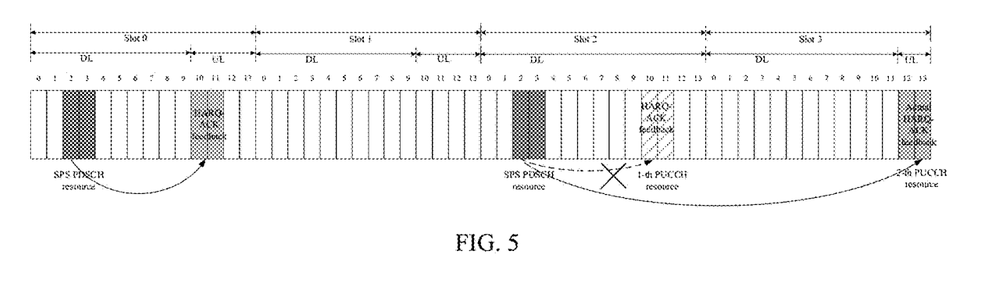
FIG. 5 is a schematic diagram of a time domain resource according to some embodiments.

For example, as shown in FIG. 5, the base station configures the ID of the PUCCH resource by means of the RRC signaling to indicate that the 10-th to 11-th symbols are PUCCH resources for transmitting the HARQ-ACK, and by means of the activation DCI of the SPS PDSCH resource. In slot 2, the 10-th to 13-th symbols are dynamically indicated as the symbols of the DL; in Slot 3, the 10t-h to 11-th symbols are dynamically indicated as the symbols of the DL, and the 12-th to 13-th symbols are dynamically indicated as the symbols of the UL. Since the 10-th to 13-th symbols in the slot 2 and the 10-th to 11-th symbols in the slot 3 are dynamically indicated as the symbols of the DL, the first PUCCH resource of the HARQ-ACK feedback collides with the uplink resources and cannot be transmitted. When the increased K1 value is increased to 1, the second PUCCH resource of the HARQ-ACK is in the 10-th to 11-th symbols of the slot 3, and since the 10-th to 11-th symbols of the slot are still the symbols of the dynamically indicated DL, the ID of the second PUCCH resource can be changed, so that the second PUCCH resource is in the 12-th to 13-th symbols of the slot 3. Then the HARQ-ACK feedback will be transmitted on the second PUCCH resource of the 12-th to 13-th symbols of the slot 2+1 (i.e., the slot 3).

Thus, in this example, if the first PUCCH resource of the HARQ-ACK feedback collides with the preset transmission resource, and if the second PUCCH resource still collides with the preset transmission resource after the K1 value is increased, the ID of the second PUCCH can be changed, so that the PUCCH resource that does not collide with the preset transmission resource is found in the slot where the second PUCCH resource is located after the K1 value is increased, and the PUCCH resource that does not collide with the preset transmission resource is used as the second PUCCH resource to send the HARQ-ACK feedback. In this way, the HARQ-ACK feedback can be sent by changing the symbols of the slot where the PUCCH resource for transmitting the HARQ-ACK feedback is located, so that the time domain resource can be utilized more reasonably.

Figure 6:
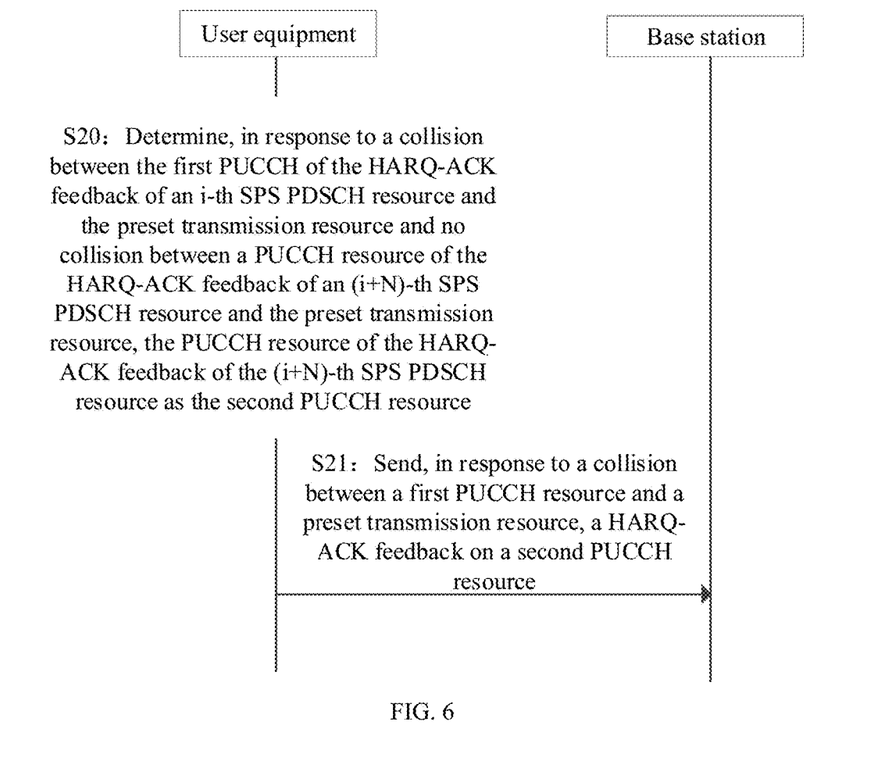
FIG. 6 is a flowchart of a method for processing an HARQ-ACK feedback according to some embodiments.

As shown in FIG. 6, in some embodiments, the method for processing the HARQ-ACK feedback further includes:

In step S20, in response to a collision between the first PUCCH of the HARQ-ACK feedback of the i-th SPS PDSCH resource and a preset transmission resource, and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource is determined as the second PUCCH resource.

Among them, i is 0 or a positive integer, and N is a positive integer.

In some embodiments, N here may be specified based on a protocol or obtained from the second RRC signaling sent by a base station. Thus, in this embodiment, it may be determined based on the protocol or indicated based on a base station that which PUCCH resource of the HARQ-ACK feedback of the SPS PDSCH resource that does not collide with the preset transmission resource and is after the i-th SPS PDSCH resource is used as the second PUCCH resource, so that the HARQ-ACK feedback of the i-th SPS PDSCH resource is the incorporated into the HARQ-ACK feedback of the SPS PDSCH resource, and are transmitted together.

In an embodiment, if the PUCCH resource of the HARQ-ACK feedback of the (i+1)-th SPS PDSCH resource does not collide with the preset transmission resource, the PUCCH resource of the HARQ-ACK feedback of the (i+1)-th SPS PDSCH resource is determined as the second PUCCH resource.

If the PUCCH resource of the HARQ-ACK feedback of the (i+1)-th SPS PDSCH resource collides with the preset transmission resource, it is determined that whether the PUCCH resource the HARQ-ACK feedback of the (i+2)-th SPS PDSCH resource collides with a preset transmission resource or not.

If not, the PUCCH resource the HARQ-ACK feedback of the (i+2)-th SPS PDCCH resource is determined as the second PUCCH resource; and if yes, whether the subsequent SPS PDSCH resource collide with the preset transmission resource or not is continued until it is determined that the PUCCH resource of the HARQ-ACK feedback of a SPS PDSCH resource does not collide with the preset transmission resource.

Thus, in this example, the PUCCH resource of the HARQ-ACK feedback of the SPS PDSCH resource in the slot close to the slot where the i-th SPS PDSCH resource is located can be found as much as possible as the second PUCCH resource, so that the success rate of HARQ-ACK feedback transmission can be further improved on the basis that the delay of receiving the HARQ-ACK feedback by the base station can be shortened.

In other embodiments, if the PUCCH resource of the HARQ-ACK of any SPS PDSCH resource after the i-th SPS PDSCH resource does not collide with the preset transmission resource, it may be used as the second PUCCH resource.

In the foregoing embodiment, if N exceeds a certain value range, for example, 16, the second PUCCH resource is not further determined.

Figure 7:
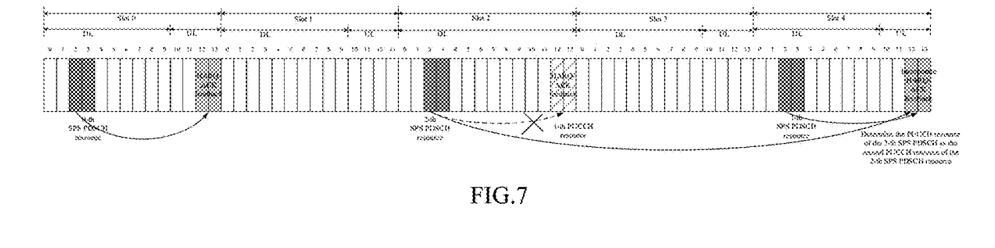
FIG. 7 is a schematic diagram of a time domain resource according to some embodiments.

For example, the period of the SPS PDSCH resource is 2 slots, the base station configures the ID of the PUCCH resource by means of the radio resource control signaling, where the ID is the position of the PUCCH resource in the time domain. In the present example, the ID indicates that the 12-th to 13-th symbols are PUCCH resources for transmitting the HARQ-ACK. The base station indicates, by means of the activation DCI of the SPS PDSCH resource, that the interval K1 value between the slot where the HARQ-ACK is located and the slot where the corresponding SPS PDSCH resource is located is 0. As shown in FIG. 7, the 0-th SPS PDSCH is in the slot 0; the first SPS PDSCH is in the slot 2; and the second SPS PDSCH is in the slot 4. In the slot 2, the 10-th to 13-th symbols are dynamically indicated as the symbols of the DL, and in the Slot 3, the 10-th to 13-th symbols are dynamically indicated as the symbols of the UL. Since the 10-th to 13-th symbols in the slot 2 are dynamically indicated as the symbols of the DL, the first PUCCH resource of the HARQ-ACK feedback cannot be transmitted because that the PUCCH resource of the second SPS PDSCH collides with the DL of the slot 2. The PUCCH resource of the second SPS PDSCH in the slot 4 (that is, the resource of the 12-th to 13-th symbols) is the symbols of the UL, and the PUCCH resource of the second SPS PDSCH does not collide with the preset transmission resource. Then, the PUCCH resource of the second SPS PDSCH is used as the second PUCCH resource, and the HARQ-ACK feedback will be transmitted in the 12-th to 13-th symbols of the slot 4.

In this way, in the embodiment of the present disclosure, the PUCCH resource of the HARQ-ACK feedback of the (i+N)-th SPS PDSCH resources after the i-th SPS PDSCH resource that does not collide with the preset transmission resource is determined as the second PUCCH resource. A method to determine the PUCCH resource is provided, in which the HARQ-ACK feedback of the i-th SPS PDSCH resource be incorporated into the HARQ-ACK resource of the (i+N)-th SPS PDSCH resource and sent together In this way, on one hand, the time domain resource for sending the HARQ-ACK resource can be saved, and the power consumption, energy consumption and the like of the UE can be saved; on the other hand, the phenomenon that HARQ-ACK feedback cannot be transmitted due to the fact that the PUCCH resource for transmitting the HARQ-ACK feedback of the SPS PDSCH resource collides with the preset transmission resource can be reduced, and the probability of success of HARQ-ACK feedback can be greatly improved.

It should be noted here that the following method for processing the HARQ-ACK feedback is applied to a base station, which is similar to the description of the method for processing the HARQ-ACK feedback applied to a user equipment. For the technical details not disclosed in the embodiment of the method for processing the HARQ-ACK feedback applied to the base station in the present disclosure, it can be referred to the description of the embodiment of the method for processing the HARQ-ACK feedback applied to the user equipment, which is not described in detail here.

Figure 8:
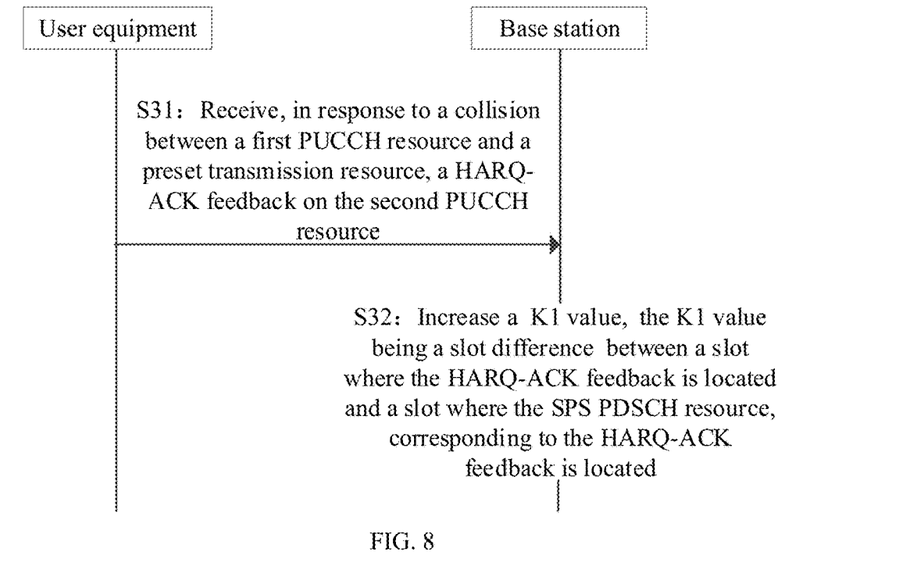
FIG. 8 is a flowchart of a method for processing an HARQ-ACK feedback according to some embodiments.

As shown in FIG. 8, according to an embodiment of the present disclosure, there is provided a method for processing the HARQ-ACK feedback, applied to a base station, including the following.

In step S31, in response to a collision between the first PUCCH resource and a preset transmission resource, HARQ-ACK feedback is received on the second PUCCH resource.

Among them, the first PUCCH resource is a resource for transmitting the HARQ-ACK feedback of the SPS PDSCH resource; and the second PUCCH resource is located after the first PUCCH resource in the time domain and does not collide with the preset transmission resource.

In some embodiments, the preset transmission resource includes: a preset transmission resource that is semi-statically configured, or a preset transmission resource that is dynamically configured.

In some embodiments, the preset transmission resource includes at least one of the following:
 a PDSCH resource, a PUSCH resource, a PDCCH resource, and a PUCCH resource other than transmitting HARQ-ACK feedback.

As shown in FIG. 8, in some embodiments, the method for processing the HARQ-ACK feedback further includes the following.

In step S32, a K1 value is increased, where the K1 value is a slot offset between a slot where the HARQ-ACK feedback is located and a slot where the SPS PDSCH resource corresponding to the HARQ-ACK feedback is located;
 a second PUCCH resource is determined based on the increased K1 value.

In some embodiments, the K1 value is less than or equal to a preset value.

In some embodiments, increasing the K1 value includes:
 increasing the K1 value according to the preset transmission resource colliding with the first PUCCH resource.

In the embodiment of the present disclosure, the K1 value may also be increased by the base station, thus implementing the scheduling of the user equipment by the base station.

In some other embodiments, the method for processing the HARQ-ACK feedback further includes:

sending a first RRC signaling to the user equipment, where the first RRC signaling carries an ID to be changed of the second PUCCH resource, and the ID is a symbol indicating a slot where the PUCCH resource is located.

In some embodiments, the method for processing the HARQ-ACK feedback further includes:

determining, in response to a collision between the first PUCCH of the HARQ-ACK feedback of the i-th SPS PDSCH resource and a preset transmission resource, and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource as the second PUCCH resource;

where, i is 0 or a positive integer, and n is a positive integer.

Specific examples are provided below in conjunction with any of the foregoing embodiments.

Example 1

As shown in FIG. 4, in the slot 2, the 10-th to 13-th symbols are dynamically indicated as the symbols of the DL; and in the slot 3, the 10-th to 13-th symbols are dynamically indicated as the symbols of the UL. In the slot 2, the 10-th to 13-th symbols are dynamically indicated as the symbols of the DL, resulting in that the first PUCCH resource of the HARQ-ACK feedback collides with the DL of the slot 2 and cannot be transmitted.

If the K1 value is increased to 1 by the communication device, the HARQ-ACK to be transmitted on the first PUCCH resource of the 12-th to 13-th symbol of the slot 2 will be changed to be transmitted on the second PUCCH resource on the 12-th to 13-th symbol of the slot 3.

Example 2

As shown in FIG. 7, the 0-th SPS PDSCH is in the slot 0s; the first SPS PDSCH is in the slot 2; and the second SPS PDSCH is in the slot 4. In the slot 2, the 10-th to 13-th symbols are dynamically indicated as the symbols of the DL, and in the slot 3, the 10-th to 13-th symbols are dynamically indicated as the symbols of the UL. In the slot 2, the 10-th to 13-th symbols are dynamically indicated as the symbols of the DL, resulting in that the first PUCCH resource of the HARQ-ACK feedback collides with the DL of the slot 2 and cannot be transmitted. The PUCCH resource of the 12-th to 13-th symbols of the second SPS PDSCH of the slot 4 is a UL symbol, and does not collide with the preset transmission resource.

By incorporating the HARQ-ACK resource of the first SPS PDSCH into the HARQ-ACK resource of the second SPS PDSCH, the communication device sends it on the second PUCCH resource of the 12-th to 13-th symbols of the slot 4.

The above examples may be applied to a communication device, and the communication device may not only be a user equipment, but also may be a base station.

Figure 9:
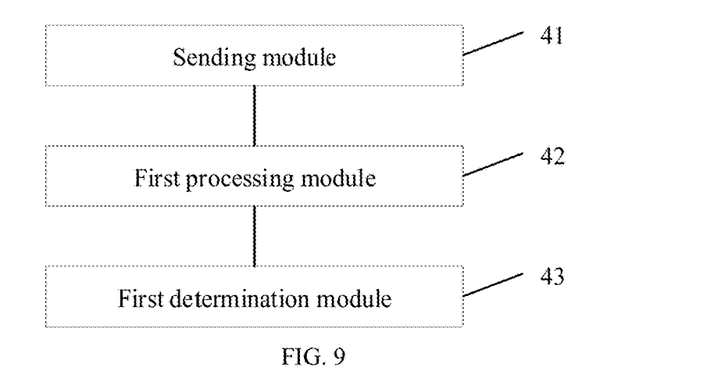
FIG. 9 is a block diagram of an apparatus for processing an HARQ-ACK feedback according to some embodiments.

As shown in FIG. 9, according to an embodiment of the present disclosure, there is further provided an apparatus for processing a HARQ-ACK feedback, which is applied to a UE and includes:

a sending module 41, configured to send a HARQ-ACK feedback on the second PUCCH resource in response to a collision between the first PUCCH resource and a preset transmission resource;

where, the first PUCCH resource is a resource for transmitting the HARQ-ACK feedback of the SPS PDSCH resource; and the second PUCCH resource is located after the first PUCCH resource in the time domain and does not collide with the preset transmission resource.

In some embodiments, the preset transmission resource includes: a preset transmission resource that is semi-statically configured, or a preset transmission resource that is dynamically configured.

In some embodiments, the preset transmission resource includes at least one of the following:

a PDSCH resource, a PUSCH resource, a PDCCH resource, and a PUCCH resource for transmitting other than HARQ-ACK feedback.

In some embodiments, the apparatus further includes:

a first processing module 42, configured to increase a K1 value, where K1 is a slot offset between a slot where the HARQ-ACK feedback is located and a slot where the SPS PDSCH resource corresponding to the HARQ-ACK feedback is located;

a first determining module 43, configured to determine the second PUCCH resource based on the increased K1 value.

In some embodiments, the K1 value is less than or equal to a preset value.

In some embodiments, the first processing module is configured to increase the K1 value according to a preset transmission resource colliding with the first PUCCH resource.

In some embodiments, the first determination module is configured to determine the PUCCH resource of the HARQ-ACK feedback of the (i+N)-th SPS PDSCH resources as the second PUCCH resource, in response to a collision between the first PUCCH of the HARQ-ACK feedback of the i-th SPS PDSCH resource and a preset transmission resource, and no collision between a PUCCH resource of the HARQ-ACK feedback of the (i+N)-th SPS PDSCH resource and the preset transmission resource, where i is 0 or a positive integer, and N is a positive integer.

Figure 10:
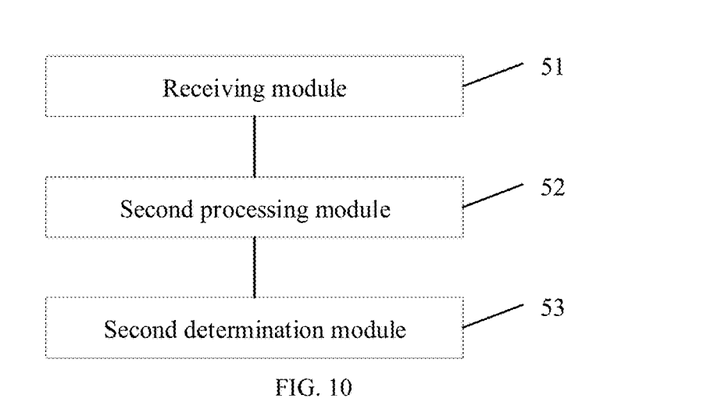
FIG. 10 is a block diagram of an apparatus for processing an HARQ-ACK feedback according to some embodiments.

As shown in FIG. 10, according to an embodiment of the present disclosure, there is further provided an apparatus for processing a HARQ-ACK feedback, which is applied to a base station and includes:

a receiving module 51, configured to receive HARQ-ACK feedback on a second PUCCH resource in response to a collision between the first PUCCH resource and a preset transmission resource;

where, the first PUCCH resource is a resource for transmitting the HARQ-ACK feedback of the SPS PDSCH resource; and the second PUCCH resource is located after the first PUCCH resource in the time domain and does not collide with the preset transmission resource.

In some embodiments, the preset transmission resource includes one of the following: a preset transmission resource that is semi-statically configured, or a preset transmission resource that is dynamically configured.

In some embodiments, the preset transmission resource includes at least one of the following:

a PDSCH resource, a PUSCH resource, a physical downlink control channel (PDCCH) resource, and a PUCCH resource for transmitting other than HARQ-ACK feedback.

In some embodiments, the apparatus further includes:

a second processing module 52, configured to increase a K1 value, where the K1 value is a slot offset between a slot where the HARQ-ACK feedback is located and a slot where the SPS PDSCH resource corresponding to the HARQ-ACK feedback is located;

a second determining module 53, configured to determine the second PUCCH resource based on the increased K1 value.

In some embodiments, the K1 value is less than or equal to a preset value.

In some embodiments, the second processing module is configured to increase the K1 value according to the preset transmission resource colliding with the first PUCCH resource.

In some embodiments, the second determination module is configured to determine the PUCCH resource of the HARQ-ACK feedback of the (i+N)-th SPS PDSCH resources as the second PUCCH resource, in response to a collision between the first PUCCH of the HARQ-ACK feedback of the i-th SPS PDSCH resource and a preset transmission resource, and no collision between a PUCCH resource of the HARQ-ACK feedback of an (i+N)-th SPS PDSCH resource and the preset transmission resource, where i is 0 or a positive integer, and N is a positive integer.

With regard to the apparatus in the above embodiments, the specific manner in which each module performs an operation has been described in detail in the embodiments related to the method, and will not be described in detail here.

According to embodiments of the present disclosure, there is provide a communication device, including:

a processor;

a memory for storing an instruction executable by the processor;

where, the processor is configured to implement the method for processing the HARQ-ACK feedback according to any embodiment of the present disclosure when running the executable instruction.

The user equipment here includes a base station or a user equipment.

Among them, the processor may include various types of storage medium, and the storage medium is a non-transitory computer storage medium, and may continue to memorize the information stored on it after the user equipment is powered down.

The processor may be connected to the memory through a bus or the like, and is configured to read an executable program stored on the memory, for example, at least one of the methods shown in FIG. 2, FIG. 6 and FIG. 8.

According to embodiments of the present disclosure, there is further provide a computer storage medium, where the computer storage medium stores with a computer-executable program, and when the executable program is executed by a processor, the method for processing the HARQ-ACK feedback according to any embodiment of the present disclosure is implemented, for example, as shown in at least one of the methods shown in FIG. 2, FIG. 6 and FIG. 8.

With regard to the apparatus in the above embodiments, the specific manner in which each module performs an operation has been described in detail in the embodiments related to the method, and will not be described in detail here.

Figure 11:
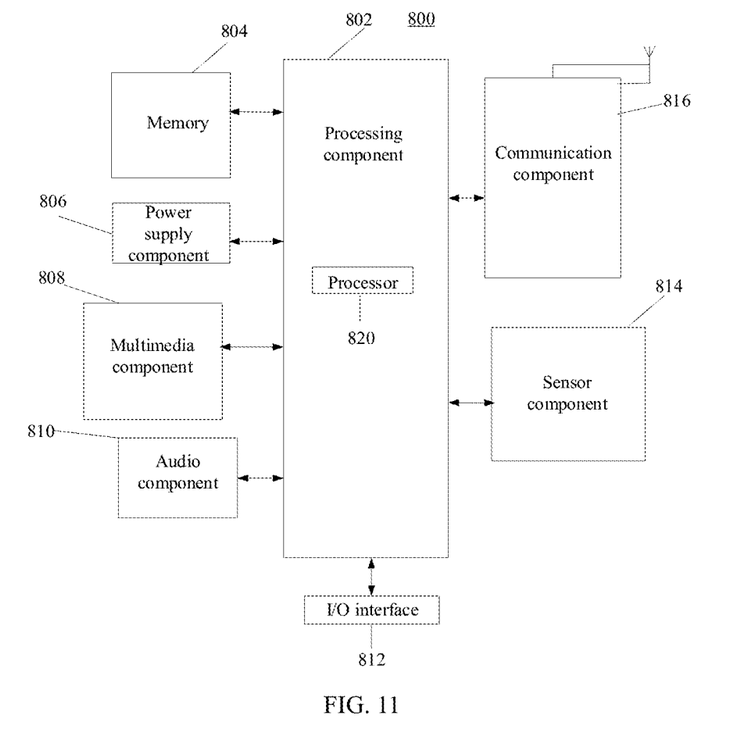
FIG. 11 is a block diagram of a user equipment according to some embodiments.

FIG. 11 is a block diagram of a user equipment 800 according to an example embodiment. For example, user equipment 800 may be a mobile phone, a computer, a digital broadcast user equipment, a messaging device, a game console, a tablet device, a medical device, an exercise device, a personal digital assistant, etc.

Referring to FIG. 11, user equipment 800 may include one or more of processing component 802, memory 804, power supply component 806, multimedia component 808, audio component 810, input/output (I/O) interface 812, sensor component 814, and communication component 816.

The processing component 802 generally controls overall operations of the user equipment 800, such as operations associated with display, telephone calls, data communications, camera operations, and recording operations. The processing component 802 may include one or more processors 820 to execute instructions to complete all or some of the steps of the foregoing methods. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the user equipment 800. Examples of such data include instructions for any application or method operating on user equipment 800, contact data, phonebook data, messages, pictures, videos, and the like. The memory 804 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 806 provides electrical power to various components of the user equipment 800. The power supply component 806 may include a power management system, one or more power sources, and other components associated with generating, managing, and allocating power to user equipment 800.

The multimedia component 808 includes a screen providing an output interface between the user equipment 800 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense a boundary of a touch or sliding action, but also detect a duration and pressure associated with the touch or sliding action. In some embodiments, the multimedia component 808 includes a front-facing camera and/or a rear-facing camera. When the user equipment 800 is in an operation mode, such as a photographing mode or a video mode, the front-facing camera and/or the rear-facing camera may receive external multimedia data. Each front camera and the rear camera may be a fixed optical lens system or have a focal length and an optical zoom capability.

The audio component 810 is configured to output and/or input an audio signal. For example, the audio component 810 includes a microphone (MIC) configured to receive an external audio signal when the user equipment 800 is in an operating mode, such as a call mode, a recording mode, and a speech recognition mode. The received audio signal may be further stored in the memory 804 or transmitted via the communication component 816. In some embodiments, the audio component 810 further includes a speaker configured to output an audio signal.

The I/O interface 812 provides an interface between the processing component 802 and peripheral interface modules, and the peripheral interface module may be a keyboard, a click wheel, a button, or the like. The button may include, but are not limited to, a home button, a volume button, a start button, and a lock button.

The sensor component 814 includes one or more sensors for providing status assessments of various aspects for the user equipment 800. For example, the sensor component 814 may detect the on/off state of the equipment 800, the relative positioning of the components, such as the display of the user equipment 800 and the keypad, the sensor component 814 may also detect changes in the location of one component of the user equipment 800 or the user equipment 800, the presence or absence of the user in contact with the user equipment 800, the orientation or acceleration/deceleration of the user equipment 800, and the temperature change of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as WiFi, 2G, or 3G, or a combination of them. In some embodiments, communication component 816 receives broadcast signals or broadcast related information from an external broadcast management system via a broadcast channel. In one example embodiment, the communication component 816 further includes a near field communication (NFC) module to facilitate short-range communication. For example, the NFC module may be implemented based on a radio frequency identification (RFID) technology, an infrared data association (RRI) technology, an ultra-wideband (UWB) technology, a Bluetooth (BT) technology, and other technologies.

In an example embodiment, user equipment 800 may be implemented by one or more application specific integrated circuits (ASIC), digital signal processors (DSP), digital signal processing devices (DSPD), programmable logic devices (PLD), field programmable gate arrays (FPGAs, controllers, microcontrollers, microprocessors, or other electronic components for performing the methods described above.

In an example embodiment, there is also provided a non-transitory computer-readable storage medium including an instruction, such as a memory 804 including an instruction executable by the processor 820 of the user equipment 800 to complete the foregoing method. For example, the non-transitory computer-readable storage medium may be a ROM, a random access memory (RAM), a CD-ROM, a magnetic tape, a floppy disk, an optical data storage device, etc.

Figure 12:
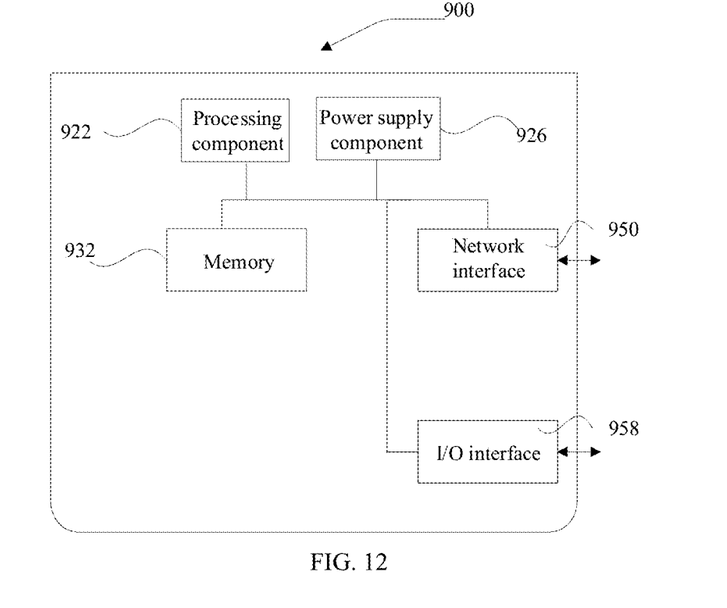
FIG. 12 is a block diagram of a base station according to some embodiments.

As shown in FIG. 12, an embodiment of the present disclosure illustrates a structure of a base station. For example, base station 900 may be provided as a network side device. Referring to FIG. 12, base station 900 includes processing component 922, which further includes one or more processors, and memory resources represented by memory 932, for storing instructions executable by processing component 922, such as applications. The application stored in the memory 932 may include one or more modules each corresponding to a set of instructions. In addition, the processing component 922 is configured to execute an instruction to perform the foregoing method described above in any method of the base station, for example, as shown in FIG. 2, FIG. 6, or FIG. 8.

The base station 900 may also include a power supply component 926 configured to perform power management of the base station 900, one wired or wireless network interface 950 configured to connect the base station 900 to the network, and an input-output (I/O) interface 958. The base station 900 may operate based on an operating system stored in the memory 932, such as Windows Server™, MAC OS X™, Unix™, Linux™, FreeBSD™, or the like.

Embodiments of the present disclosure disclose a method and an apparatus for processing a HARQ-ACK feedback, a communication device, and a storage medium.

According to a first aspect of the embodiments of the present disclosure, there is provided a method for processing a HARQ-ACK feedback, applied to a UE, and the method includes:

sending, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

In some embodiments, the preset transmission resource includes: the preset transmission resource that is semi-statically configured, or the preset transmission resource that is dynamically configured.

In some embodiments, the preset transmission resource includes at least one of:
a PDSCH resource, a physical uplink shared channel (PUSCH) resource, a physical downlink control channel (PDCCH) resource, and a PUCCH resource for transmitting other than the HARQ-ACK feedback.

In some embodiments, the method further includes:
increasing a K1 value, wherein the K1 value is a slot offset between a slot where the HARQ-ACK feedback is located and a slot where an SPS PDSCH resource corresponding to the HARQ-ACK feedback is located; and determining the second PUCCH resource based on the K1 value.

In some embodiments, the K1 value is less than or equal to a preset value.

In some embodiments, the increasing the K1 value includes:
increasing the K1 value according to the preset transmission resource colliding with the first PUCCH resource.

In some embodiments, the method further includes:
determining, in response to a collision between the first PUCCH resource of the HARQ-ACK feedback of an i-th SPS PDSCH resource and the preset transmission resource and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource as the second PUCCH resource; wherein i is 0 or a positive integer and N is a positive integer.

According to a second aspect of the embodiments of the present disclosure, there is provided method for processing a HARQ-ACK feedback, applied to a base station, the method including:

receiving, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

In some embodiments, the preset transmission resource includes: the preset transmission resource that is semi-statically configured, or the preset transmission resource that is dynamically configured.

In some embodiments, the preset transmission resource includes at least one of:

a PDSCH resource, a physical uplink shared channel (PUSCH) resource, a physical downlink control channel (PDCCH) resource, and a PUCCH resource for transmitting other than the HARQ-ACK feedback.

In some embodiments, the method further includes:

increasing a K1 value, wherein the K1 value is a slot offset between a slot where the HARQ-ACK feedback is located and a slot where an SPS PDSCH resource corresponding to the HARQ-ACK feedback is located; and determining the second PUCCH resource based on the K1 value.

In some embodiments, the K1 value is less than or equal to a preset value.

In some embodiments, the increasing the K1 value includes:

increasing the K1 value according to the preset transmission resource colliding with the first PUCCH resource.

In some embodiments, the method further includes:

determining, in response to a collision between the first PUCCH resource of the HARQ-ACK feedback of an i-th SPS PDSCH resource and the preset transmission resource and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource as the second PUCCH resource; wherein i is 0 or a positive integer and N is a positive integer.

According to a third aspect of the embodiments of the present disclosure, there is provided an apparatus for processing a HARQ-ACK feedback, applied to a user equipment (UE), the apparatus including:

a sending module, configured to send a hybrid automatic retransmission request acknowledgement (HARQ-ACK) feedback on a second PUCCH resource in response to a collision between a first physical uplink control channel (PUCCH) resource and a preset transmission resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

In some embodiments, the preset transmission resource includes: the preset transmission resource that is semi-statically configured, or the preset transmission resource that is dynamically configured.

In some embodiments, the preset transmission resource includes at least one of:

a PDSCH resource, a physical uplink shared channel (PUSCH) resource, a physical downlink control channel (PDCCH) resource, and a PUCCH resource for transmitting other than the HARQ-ACK feedback.

In some embodiments, the apparatus further includes:

a first processing module, configured to increase a K1 value, wherein the K1 value is a slot offset between a slot where the HARQ-ACK feedback is located and a slot where an SPS PDSCH resource corresponding to the HARQ-ACK feedback is located; and a first determination module, configured to determine the second PUCCH resource based on the K1 value.

In some embodiments, the K1 value is less than or equal to a preset value.

In some embodiments, the first processing module is configured to increase the K1 value according to the preset transmission resource colliding with the first PUCCH resource.

In some embodiments, the first determination module is configured to determine, in response to a collision between the first PUCCH resource of the HARQ-ACK feedback of an i-th SPS PDSCH resource and the preset transmission resource and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource as the second PUCCH resource; wherein i is 0 or a positive integer and N is a positive integer.

According to a fourth aspect of the embodiments of the present disclosure, there is provided an apparatus for processing a HARQ-ACK feedback, applied to a base station, the apparatus including:

a receiving module, configured to receive a hybrid automatic retransmission request acknowledgement (HARQ-ACK) feedback on a second PUCCH resource in response to a collision between a first physical uplink control channel (PUCCH) resource and a preset transmission resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource.

In some embodiments, the preset transmission resource includes: the preset transmission resource that is semi-statically configured, or the preset transmission resource that is dynamically configured.

In some embodiments, the preset transmission resource includes at least one of:

a PDSCH resource, a physical uplink shared channel (PUSCH) resource, a physical downlink control channel (PDCCH) resource, and a PUCCH resource for transmitting other than the HARQ-ACK feedback.

In some embodiments, the apparatus further includes:

a second processing module, configured to increase a K1 value, wherein the K1 value is a slot offset between a slot where the HARQ-ACK feedback is located and a slot where an SPS PDSCH resource corresponding to the HARQ-ACK feedback is located; and a second determination module, configured to determine the second PUCCH resource based on the K1 value.

In some embodiments, the K1 value is less than or equal to a preset value.

In some embodiments, the second processing module is configured to increase the K1 value according to the preset transmission resource colliding with the first PUCCH resource.

In some embodiments, the second determination module is configured to determine, in response to a collision between the first PUCCH resource of the HARQ-ACK feedback of an i-th SPS PDSCH resource and the preset transmission resource and no collision between a PUCCH resource of the HARQ-ACK feedback of an (i+N)-th SPS PDSCH resource and the preset transmission resource, the PUCCH resource of the HARQ-ACK feedback of the (i+N)-th SPS PDSCH resource as the second PUCCH resource; wherein i is 0 or a positive integer and N is a positive integer.

According to a fifth aspect of the embodiments of the present disclosure, there is provided a communication device, the communication device includes:
  a processor; and
  a memory, configured to store an instruction executable by the processor;
  where the processor is configured to implement the method for processing the HARQ-ACK feedback according to any embodiment of the present disclosure when running the executable instruction.

According to a sixth aspect of the embodiments of the present disclosure, there is provided a computer storage medium, the computer storage medium stores with a computer-executable program, and when the executable program is executed by a processor, the method for processing the HARQ-ACK feedback according to any embodiment of the present disclosure is implemented.

The technical solutions provided in the embodiments of the present disclosure may include the following beneficial effects:

In the embodiments of the present disclosure, the HARQ-ACK feedback is sent on the second PUCCH resource that does not collide with the preset transmission resource and is after the first PUCCH resource, when the first PUCCH resource of the HARQ-ACK feedback of the SPS PDSCH resource collides with the preset transmission resource, so that the phenomenon that the HARQ-ACK feedback cannot be transmitted due to the collision between the PUCCH resource for transmitting the HARQ-ACK feedback of the SPS PDSCH resource and the preset transmission resource can be greatly reduced, and the probability of successful transmission of the HARQ-ACK feedback can be greatly improved.

Other embodiments of the present disclosure will be apparent to those skilled in the art from consideration of the specification and practice of the present disclosure disclosed herein. The present disclosure is intended to cover any variations, uses, or adaptations of the present disclosure following the general principles of the present disclosure and including common general knowledge or customary technical means in the art not disclosed in the present disclosure. It is intended that the description and embodiments be considered as examples only, with a true scope and spirit of the present disclosure being indicated by the following claims.

It should be understood that the present disclosure is not limited to the exact construction that has been described above and illustrated in the accompanying drawings, and that various modifications and changes may be made without departing from the scope of the present disclosure. It is intended that the scope of the present disclosure be limited by the appended claims.

What is claimed is:

1. A method for processing a HARQ-ACK feedback, performed by a user equipment (UE), comprising:
  sending, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource;
  wherein the second PUCCH resource is determined based on an increased K1 value, the increased K1 value is increased based on a K1 value, the K1 value is a slot offset between a slot where the HARQ-ACK feedback is located and a slot where an SPS PDSCH resource corresponding to the HARQ-ACK feedback is located, and the K1 value is less than or equal to a preset value.

2. The method according to claim 1, wherein the preset transmission resource comprises:
  the preset transmission resource that is semi-statically configured, or the preset transmission resource that is dynamically configured.

3. The method according to claim 1, wherein the preset transmission resource comprises at least one of:
  a PDSCH resource, a physical uplink shared channel (PUSCH) resource, a physical downlink control channel (PDCCH) resource, or a PUCCH resource for transmitting other than the HARQ-ACK feedback.

4. The method according to claim 1, further comprising:
  increasing the K1 value; and
  determining the second PUCCH resource based on the increased K1 value.

5. The method according to claim 4, wherein increasing the K1 value comprises:
  increasing the K1 value according to the preset transmission resource colliding with the first PUCCH resource.

6. A method for processing a HARQ-ACK feedback, performed by a base station, comprising:
  receiving, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource;
  wherein the second PUCCH resource is determined based on an increased K1 value, the increased K1 value is increased based on a K1 value, the K1 value is a slot offset between a slot where the HARQ-ACK feedback is located and a slot where an SPS PDSCH resource corresponding to the HARQ-ACK feedback is located, and the K1 value is less than or equal to a preset value.

7. The method according to claim 6, wherein the preset transmission resource comprises:

the preset transmission resource that is semi-statically configured, or the preset transmission resource that is dynamically configured.

8. The method according to claim 6, wherein the preset transmission resource comprises at least one of:
a PDSCH resource, a physical uplink shared channel (PUSCH) resource, a physical downlink control channel (PDCCH) resource, or a PUCCH resource for transmitting other than the HARQ-ACK feedback.

9. The method according to claim 6, further comprising:
increasing the K1 value; and
determining the second PUCCH resource based on the increased K1 value.

10. The method according to claim 9, wherein increasing the K1 value comprises:
increasing the K1 value according to the preset transmission resource colliding with the first PUCCH resource.

11. A communication device, comprising:
a processor; and
a memory, configured to store an instruction executable by the processor;
wherein the processor, when running the executable instruction applied to a user equipment (UE) for processing a HARQ-ACK feedback, is configured to:
send, in response to a collision between a first physical uplink control channel (PUCCH) resource and a preset transmission resource, a hybrid automatic retransmission request acknowledgement (HARQ-ACK) feedback on a second PUCCH resource; wherein the first PUCCH resource is a resource for transmitting the HARQ-ACK feedback of a downlink semi-persistent scheduling (SPS) physical downlink shared channel (PDSCH) resource, and the second PUCCH resource is located after the first PUCCH resource in a time domain and does not collide with the preset transmission resource;
wherein the second PUCCH resource is determined based on an increased K1 value, the increased K1 value is increased based on a K1 value, the K1 value is a slot offset between a slot where the HARQ-ACK feedback is located and a slot where an SPS PDSCH resource corresponding to the HARQ-ACK feedback is located, and the K1 value is less than or equal to a preset value.

12. A non-transitory computer-readable storage medium, wherein the computer storage medium stores with a computer-executable program, and when the executable program is executed by a processor, the method for processing the HARQ-ACK feedback according to claim 1 is implemented.

13. The communication device according to claim 11, wherein the processor is further configured to:
increase the K1 value; and
determine the second PUCCH resource based on the increased K1 value.

14. A communication device, comprising:
a processor; and
a memory, configured to store an instruction executable by the processor;
wherein the processor is configured to implement the method for processing the HARQ-ACK feedback according to claim 6 when running the executable instruction.

15. A non-transitory computer-readable storage medium, wherein the computer storage medium stores with a computer-executable program, and when the executable program is executed by a processor, the method for processing the HARQ-ACK feedback according to claim 6 is implemented.

* * * * *